Patented Dec. 15, 1942

2,304,985

UNITED STATES PATENT OFFICE 2,304,985

PURIFICATION OF TRIMETHYLOL-METHYL-METHANE

Joseph A. Wyler, Allentown, Pa., assignor to Trojan Powder Company, Allentown, Pa.

No Drawing. Application February 14, 1941, Serial No. 378,863

3 Claims. (Cl. 260—637)

This invention relates to a process for the purification of trimethylol-methyl-methane.

Trimethylol-methyl-methane is usually prepared by the condensation of propyl aldehyde with formaldehyde in the presence of calcium hydrate. Its formula is $CH_3 \cdot C(CH_2OH)_3$. It is very soluble in methyl, ethyl and propyl alcohols, glycerine and in water; insoluble in carbon tetrachloride, ethylene dichloride, and in gasoline. None of the above solvents is a satisfactory medium for the commercial purification of this substance for the reason that they dissolve too much at low temperatures and produce unmanageable syrups.

I have discovered that dioxane $$(O:(CH_2CH_2)_2:O)$$

is an excellent agent for the purification of trimethylol-methyl-methane. It boils at about 100° C., dissolves a large amount of the trimethylol-methyl-methane in the hot and deposits a substantial amount of crystals of this product upon cooling. Rough tests indicate that the solubility of trimethylol-methyl-methane in dioxane at various temperatures is as follows:

| Temp. °C. | Parts trimethylol-methyl-methane/100 solution |
|---|---|
| 82 | 48 |
| 63 | 19 |
| 30 | 3 |

As an example of how I may use dioxane I give the following:

Example

About 225 parts (by weight) of a crude trimethylol-methyl-methane are treated with about 700 parts (by weight) of dioxane, and the mixture heated to about 70° C. This is then filtered and filtrate cooled with stirring. About 185 parts of hard, clear, distinct crystals separate. These are filtered off or centrifuged, washed with dioxane and dried. The melting point of this product is usually about 204° C. The filtrate may be used over again in a succeeding batch and the dioxane may be recovered by distillation when desired.

The use of dioxane has a particular advantage in that it does not dissolve sodium, potassium or calcium formate and may therefore be used to separate these salts from the trimethylol-methyl-methane by simple filtration of a mixture containing any of these associated with the trimethylol-methyl-methane as is the case when the latter is made by condensing propyl aldehyde and formaldehyde in the presence of sodium hydroxide, potassium hydroxide, or calcium hydrate.

The example given above is for purposes of illustration only and is not intended to limit me to the operative details mentioned; I may, for instance, use proportions of solute to solvent which enable me to separate crystals at above 50° C., or higher, or I may take off a fraction between 30° and 60° C. or I may simply cool as in the example.

I claim:

1. The process for the purification of trimethylol-methyl-methane which comprises dissolving the latter in hot dioxane, cooling the resulting solution and separating the crystals of trimethylol-methyl-methane which form.

2. The process for the purification of trimethylol-methyl-methane which comprises dissolving the latter in dioxane and effecting the crystallization of trimethylol-methyl-methane from the resulting solution.

3. The process for the purification of trimethylol-methyl-methane which comprises making an almost saturated solution of trimethylol-methyl-methane in dioxane at about 70° C. and cooling this mixture, with stirring, to effect crystallization of the trimethylol-methyl-methane.

JOSEPH A. WYLER.